(12) United States Patent  
Rehman

(10) Patent No.: US 8,042,737 B2
(45) Date of Patent: Oct. 25, 2011

(54) RFID KEY ROTATION SYSTEM

(75) Inventor: Samuelson Rehman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

(21) Appl. No.: 11/758,538

(22) Filed: Jun. 5, 2007

(65) Prior Publication Data

US 2008/0302871 A1 Dec. 11, 2008

(51) Int. Cl.
*G06F 19/00* (2011.01)
*G06K 5/00* (2006.01)

(52) U.S. Cl. ........................................ 235/385; 235/380

(58) Field of Classification Search ................ 235/385, 235/380, 435, 487, 492, 494; 707/10, 101; 726/9, 20, 27, 30
See application file for complete search history.

(56) References Cited

U.S. PATENT DOCUMENTS

| | | | |
|---|---|---|---|
| 5,365,516 A | 11/1994 | Jandrell | |
| 6,600,418 B2 | 7/2003 | Francis et al. | |
| 6,832,251 B1 | 12/2004 | Gelvin et al. | |
| 6,843,415 B2 * | 1/2005 | Vogler | 235/385 |
| 7,000,834 B2 * | 2/2006 | Hind et al. | 235/385 |
| 7,295,132 B2 | 11/2007 | Steiner | |
| 7,403,120 B2 | 7/2008 | Duron et al. | |
| 7,633,387 B2 | 12/2009 | Carmichael et al. | |
| 2002/0111819 A1 | 8/2002 | Li et al. | |
| 2003/0009398 A1 | 1/2003 | Lin et al. | |
| 2003/0144985 A1 * | 7/2003 | Ebert | 707/1 |
| 2003/0227392 A1 * | 12/2003 | Ebert et al. | 340/825.49 |
| 2006/0033608 A1 * | 2/2006 | Juels et al. | 235/436 |
| 2006/0080732 A1 * | 4/2006 | Ohkubo et al. | 726/9 |
| 2006/0181397 A1 | 8/2006 | Limbachiya | |
| 2006/0230276 A1 | 10/2006 | Nochta | |
| 2007/0174146 A1 | 7/2007 | Tamarkin et al. | |
| 2007/0257857 A1 | 11/2007 | Marino et al. | |
| 2008/0024268 A1 | 1/2008 | Wong | |
| 2008/0030335 A1 | 2/2008 | Nishida et al. | |

* cited by examiner

*Primary Examiner* — Thien M Le
(74) *Attorney, Agent, or Firm* — Kilpatrick Townsend & Stockton LLP

(57) ABSTRACT

In various embodiments, a method for tracking objects includes receiving an internal identifier associated with an object. A first key or external identifier for a tag is associated with the internal identifier. A second external identifier is generated and the second external identifier is then written to the tag. The second external identifier is associated with the internal identifier associated with the object.

20 Claims, 11 Drawing Sheets

RFID KEY ROTATION SYSTEM

CROSS-REFERENCES TO RELATED APPLICATIONS

The present disclosure may be related to the following commonly assigned applications/patents:

This application is related to co-pending U.S. patent application Ser. No. 11/685,655 filed Mar. 13, 2007 and entitled "Virtualization and Quality of Data;"

This application is related to co-pending U.S. patent application Ser. No. 11/685,673 filed Mar. 13, 2007 and entitled "Real-Time and Offline Location Tracking Using Passive RFID Technologies;" and This application is related to co-pending U.S. patent application Ser. No. 11/758,532, filed Jun. 5, 2007 and entitled "RFID and Sensor Signing System;"

The respective disclosures of these applications/patents are incorporated herein by reference in their entirety for all purposes.

BACKGROUND OF THE INVENTION

Embodiments of the present invention generally relate to Radio Frequency Identification (RFID) applications. More specifically, embodiments of the present invention relate to techniques for tracking objects using key rotation.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Moreover, in order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. Accordingly, with the addition of each sensor device, a specific application may be required to access the sensor data from the sensor device. This vendor lock-in leads to having too many non-integrated applications, creates unnecessary complexity, and also increases costs associated with the management and deployment of RFID technologies.

One solution is to embed the sensor device with the RFID tag. For example, one cold chain solution provides an RFID tag embedded with a temperature sensor. Cold chain refers to a temperature-controlled supply chain. An unbroken cold chain is an uninterrupted series of storage and distribution activities which maintain a given temperature range. A reader can read both the identifier of the RFID as well as the temperature from the embedded sensor.

However, by embedding sensors with RFID tags, the cost, and complexity associated with each RFID tag increase. Furthermore, computer applications configured to read the sensor data are still tied directly to specific RFID readers. Thus, the only items for which sensor data can be used from those applications are still those that can be tagged and directly sensed using the specific vendor supplied RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques for tracking objects using key rotation.

In various embodiments, a method for tracking objects includes receiving an internal identifier associated with an object. A first key or external identifier for a tag is associated with the internal identifier. A second external identifier is generated and the second external identifier is then written to the tag. The second external identifier is associated with the internal identifier associated with the object.

In some embodiments, a policy is received specifying creation of one or more external identifiers for the tag. Generating the second external identifier may include generating the second external identifier based on the policy. A rotation scheme may also be received indicating when to rotate an external identifier associated with the tag. In response to receiving the first external identifier, a determination may be made whether to generate an external identifier based on the rotation scheme. Generating the second external identifier may include generating the second external identifier in response to a positive determination to generate the external identifier. In some embodiments, the rotation scheme may include a rotation window.

In various embodiments, a third external identifier is generated based on one or more external identifiers previously written to the tag. The third external identifier is then associated with the internal identifier associated with the object. The internal identifier may include an Electronic Product Code identifier. The tag may include an RFID tag.

In one embodiment, a data processing system for tracking objects includes a processor and memory. The memory is coupled to the processor, and configured to store a plurality of code modules which when executed by the processor cause the processor to receive an internal identifier associated with an object, associate a first external identifier for a tag with the internal identifier, generate a second external identifier and one or more instructions to write the second external identifier to the tag, and associate the second external identifier with the internal identifier associated with the object.

In some embodiments, a computer program product is stored on a computer readable medium for tracking objects. The computer program product includes code for receiving an internal identifier associated with an object, code for associating a first external identifier for a tag with the internal identifier, code for generating a second external identifier and writing the second external identifier to the tag, and code for associating the second external identifier with the internal identifier associated with the object.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.
Collection of Sensor Data In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
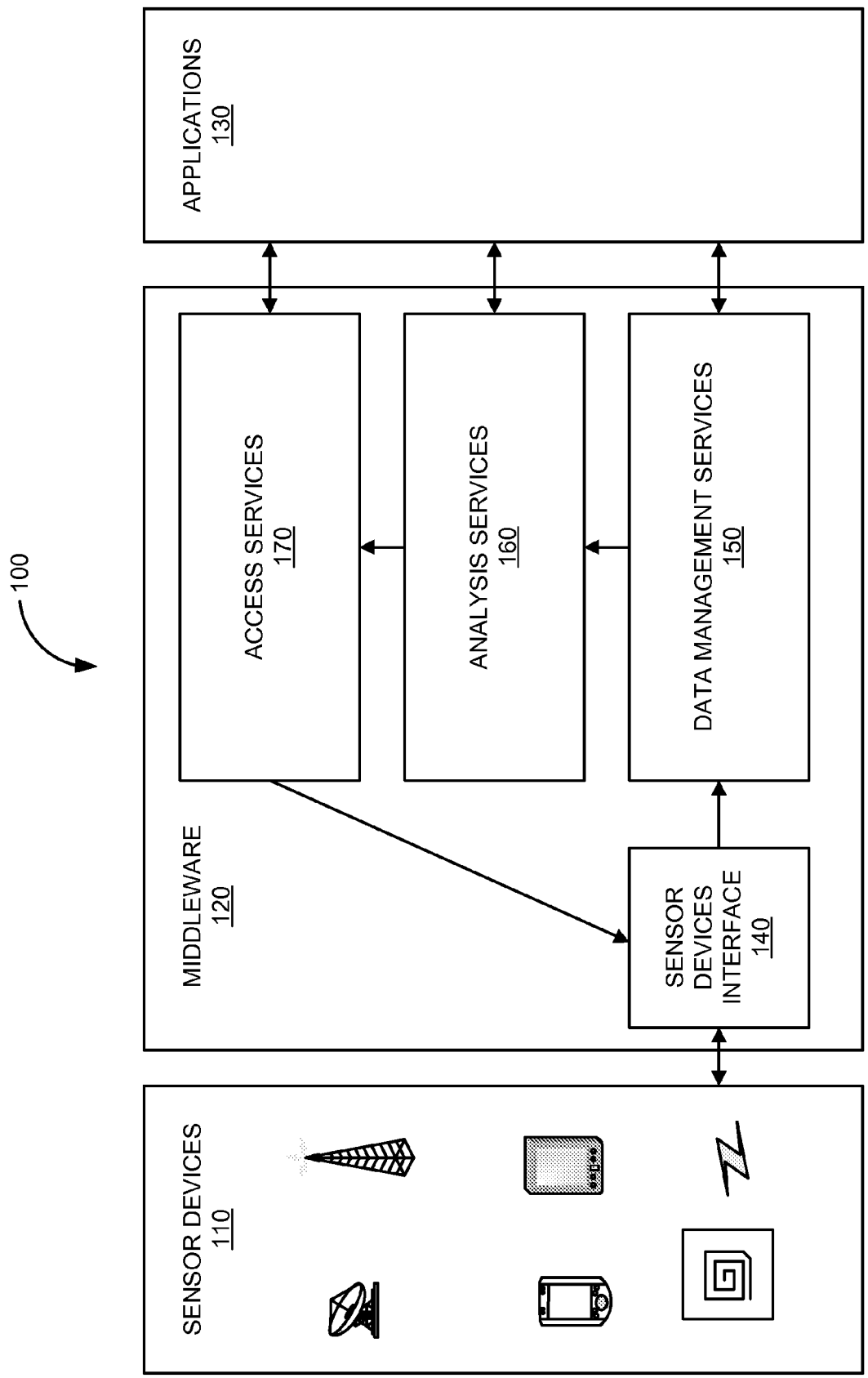
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
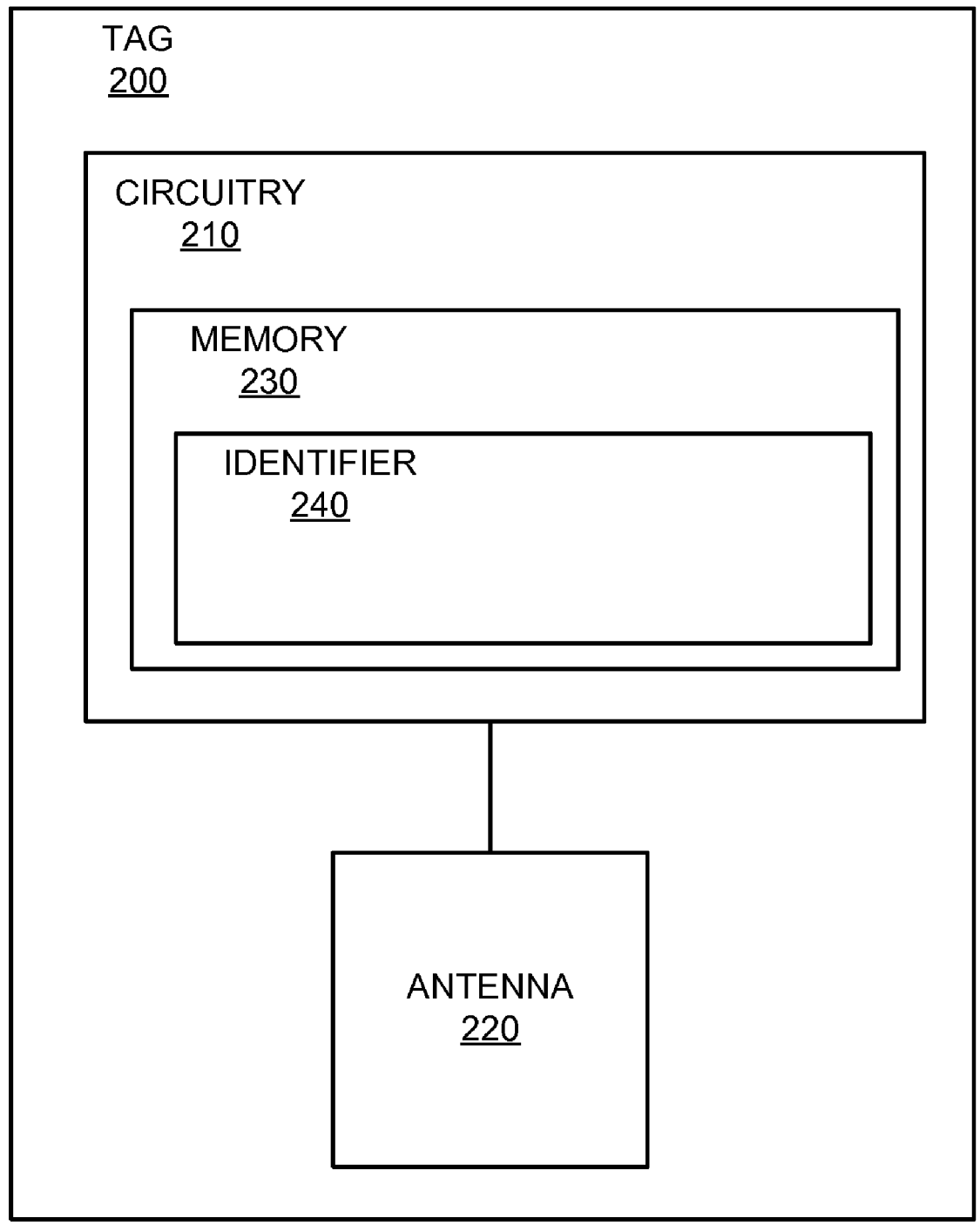
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPCglobal, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
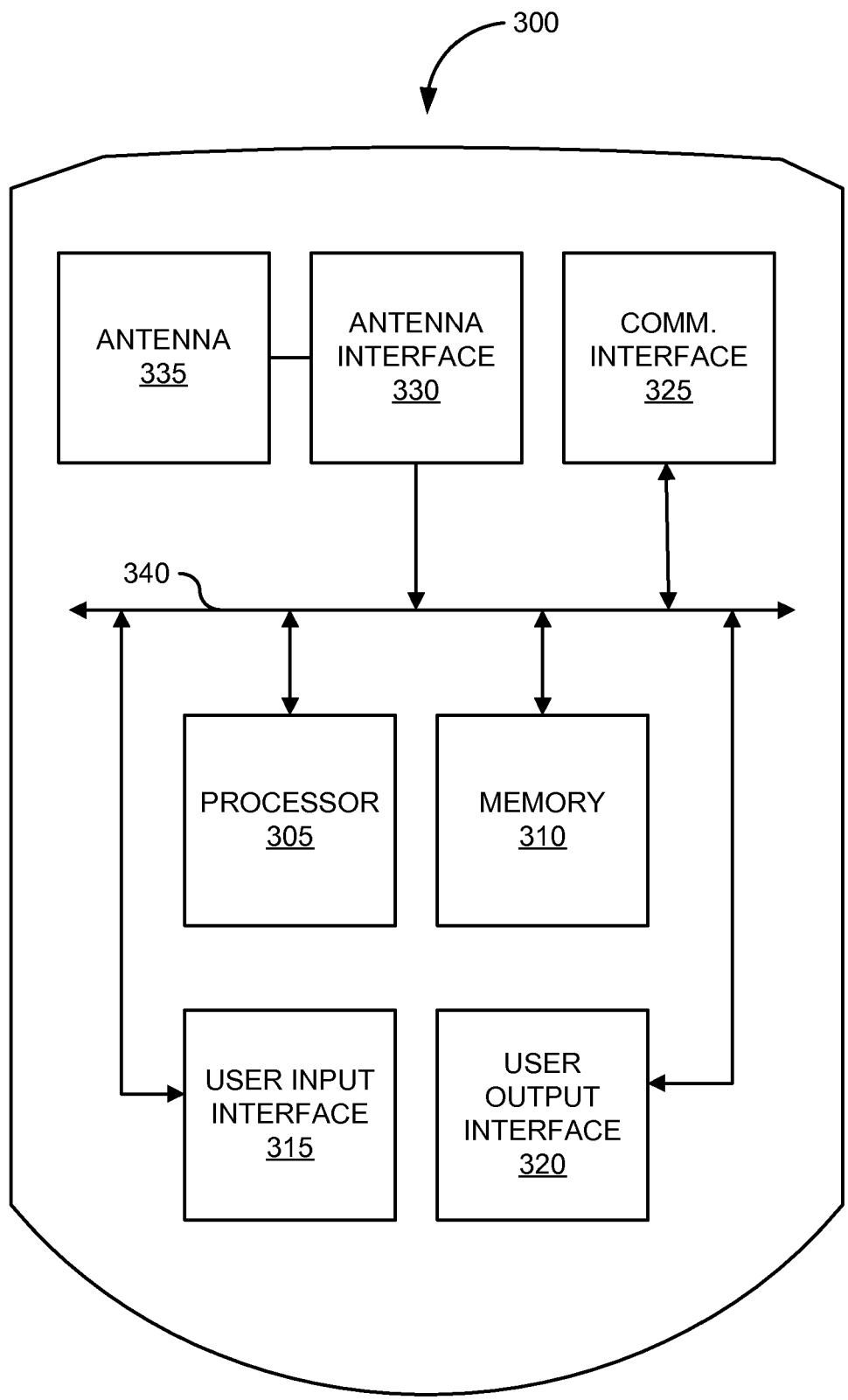
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultra-high, and microwave frequencies to store and retrieve data from products or devices using RFID tags.

Figure 4:
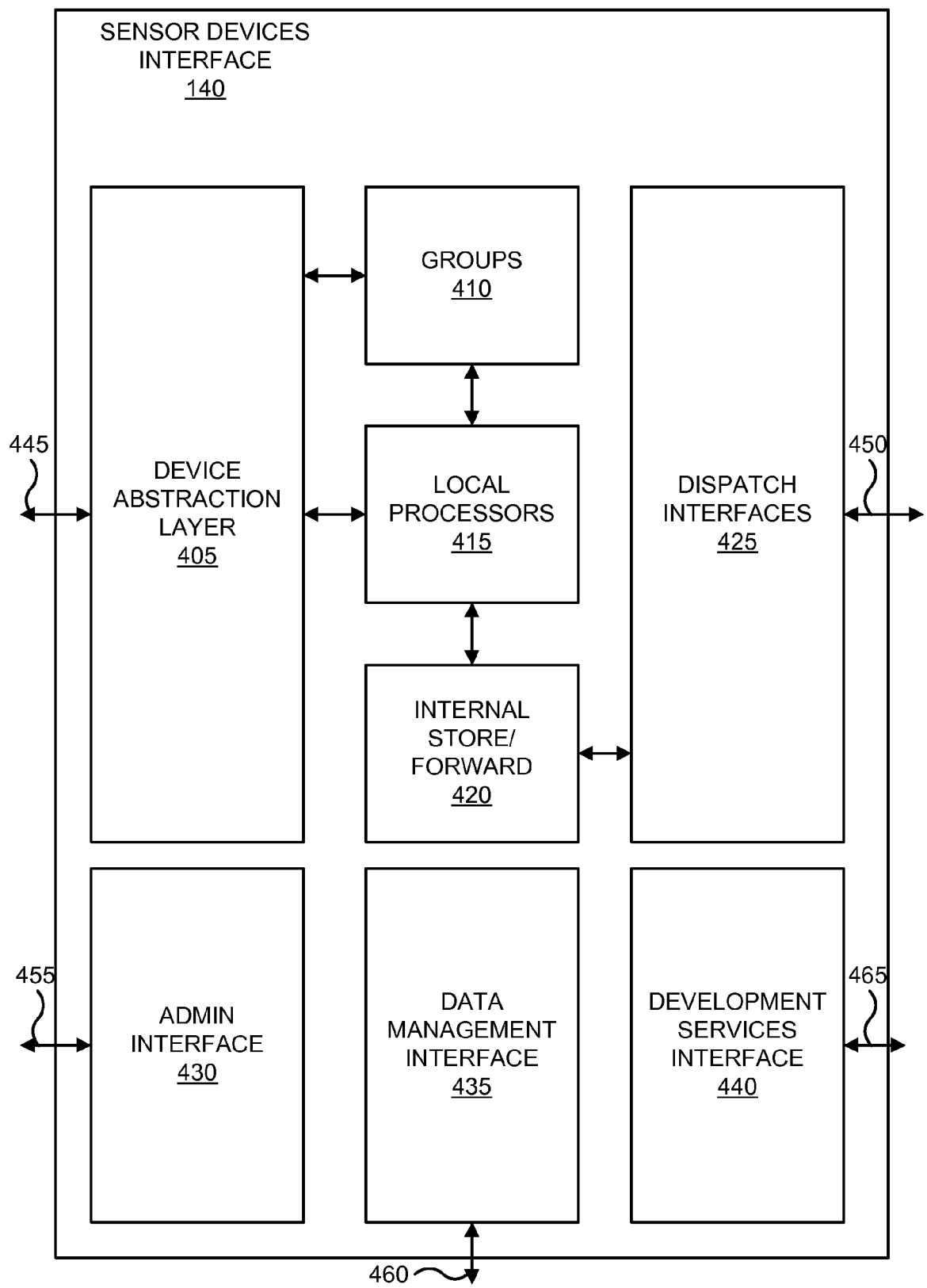
FIG. 4 is a block diagram of a system for interfacing with sensor devices to provide virtualization and quality of data in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Key Rotation

In general, an RFID key or identifier, such as an EPCglobal id, is burned into or written to a tag at label printing time. Typically, the identifier does not change, and the identifier attaches to an object or item until the tag/label is destroyed or removed. Because of this persistence, privacy concerns become an issue due to the fact that with generally available equipment and hardware, one can track the movement and lifecycle of a particular item or object, much like a cookie in a browser tracks a user the Internet browsing habits of the user.

In various embodiments, system 100 provides for providing central or federated pointer maps. For example, system 100 may include a secure map manager (e.g., sensor devices interface 140 of FIG. 1). In general, the secure map manager uses a changing or alternative tag ID. The secure map manager provides a mapping between an ID associated with an object or item, and an ID associated with a tag that can be randomized and written or printed into a tag/label. Since the tag ID can now be changed, it is no longer possible for applications to track movement of an item, without being privy to the associated mappings.

In some embodiments, system 100 further provides a windowing feature in addition to the tag ID mappings. Where it is possible to know the approximate range of movement of the tags, for example, that these tags are always located in San Francisco or always located within a given warehouse, then the location of the tags can be tied to a specific range provided by the map manager. Accordingly, the map manager may map a small set of tag IDs to a much bigger set maintained by the map manager.

For example, if all 96-bit tag IDs use are used with 0xFF0F 0000 0000, then the top 32 bits are always the same with each tag, and a tag really only needs to store at most 64 bits. The map 0xFF0F 0000 0000 provides the window for use with all tags for the give location or range of movement. The map server may return the true de-referenced 96-bit tag ID data to an application, but the extra bits in the actual tag can be used for other purposes, such as a secure signature, for parity keys, and the like.

In various embodiments, system 100 provides a mechanism to disrupt external applications from tracking a physical item. For example, the map manager may randomly rotate keys or identifiers assigned to tags, and update the mappings in a map manager. By generating and reusing tag IDs or keys, it becomes close to impossible for external applications to track any particular item.

Generally, rotation may be done when tag is read. In some embodiments, system 100 provides that the map manager may be queried to determine if a rotation should be done for the read tag. If rotation should be done, a new key may be generated. This new key is then rewritten to the tag. Since writing a tag in the field is typically not always reliable and may not be considered an atomic process, the map manager may store both the old and the new key maps. The map manager may store the old and new key maps until any valid read is made on the new key at another or the same location, then the old key map can be safely purged. A two-phased approach typically guarantees that the ability to dereference for the read key to the actual ID, even in an environment where it is typically not possible to make the key operations of generating, writing, and read back atomic processes.

Figure 5:
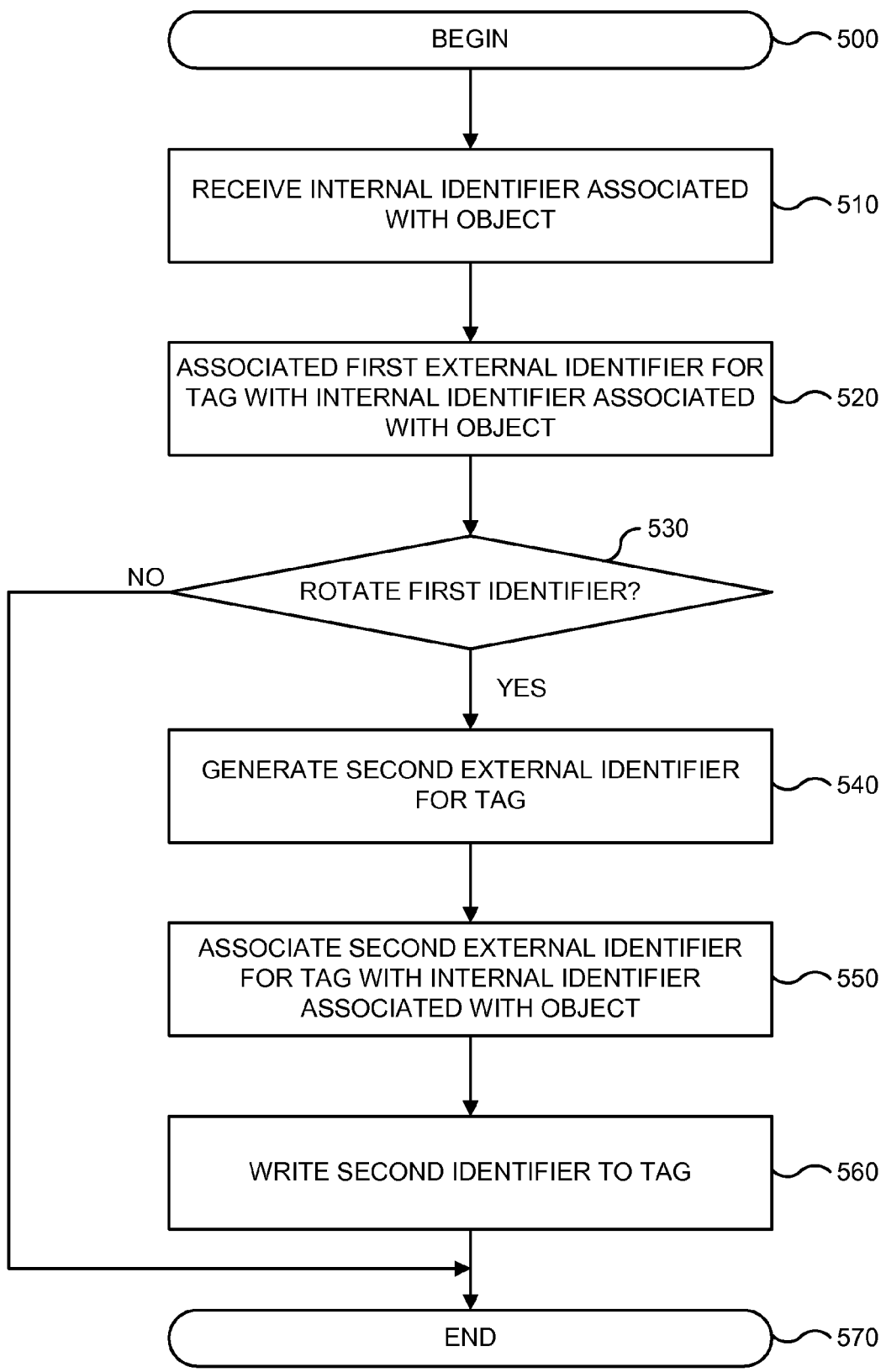
FIG. 5 is a simplified flowchart for tracking objects in one embodiment according to the present invention.

FIG. 5 is a simplified flowchart for tracking objects in one embodiment according to the present invention. The processing depicted in FIG. 5 may be performed by software modules (e.g., instructions or code) executed by a processor of a computer system, by hardware modules of the computer system, or combinations thereof. In this example, processing is performed by sensor devices interface 140. FIG. 5 begins in step 500.

In step 510, sensor devices interface 140 receives an internal identifier associated with an object. An internal identifier is any set of numbers, characters, symbols, and the like. Some examples of internal identifiers that may be associated with an object are UPC codes, EPC codes, RFID keys or identifiers, and the like.

In step 520, sensor devices interface 140 associates a first external identifier for a tag with the internal identifier associated with the object. An external identifier is any set of numbers, characters, symbols, and the like. Some examples of external identifiers are RFID keys or identifiers. An external identifier may be a full sized RFID identifier, or a reduced bit set identifier, for example having 16, 32, 64, or 96 bits. An external identifier may also include other information, such as a secure signature, a parity key, a checksum, and the like.

In step 530, sensor devices interface 140 determines whether to rotate the first external identifier. A determination to rotate an external identifier may be made based on a policy or rule that establishes a particular time frame for rotating tags, criteria for rotation, a particular location or locations at which tags may be rotated, and the like. The determination may be performed in response to reading the first external identifier using a reader/interrogator. The determination may also be performed at a predetermined location or after a predetermined period of time.

If a positive determination is made, in step 540, sensor devices interface 140 generates a second external identifier for the tag. In step 550, sensor devices interface 140 associates the second external identifier for the tag with the internal identifier associated with the object. The associated by sensor devices interface 140 creates a mapping between external identifiers for RFID tags and internal identifiers associated with the objects. Thus, applications can interface with sensor devices interface 140 to provide tracking of objects without tying a given external identifier to an object for the objects entire life cycle. Moreover, sensor devices interface 140 provides privacy and security in that external application may not track the true identity of an object, because sensor devices interface 140 can change or rotate an external identifier at any given moment during the objects lifecycle.

In step 540, sensor devices interface 140 writes the second external identifier to the tag. For example, sensor devices interface 140 may generate one or more instructions indicating to a reader/interrogator to set the tag in write mode. The reader then transmits the second external identifier to the tag, such that the second external identifier is stored in the tag's memory. The reader may further attempt to read the second external identifier from the tag to verify success of the write operation. FIG. 5 ends in step 570.

Figure 6A:
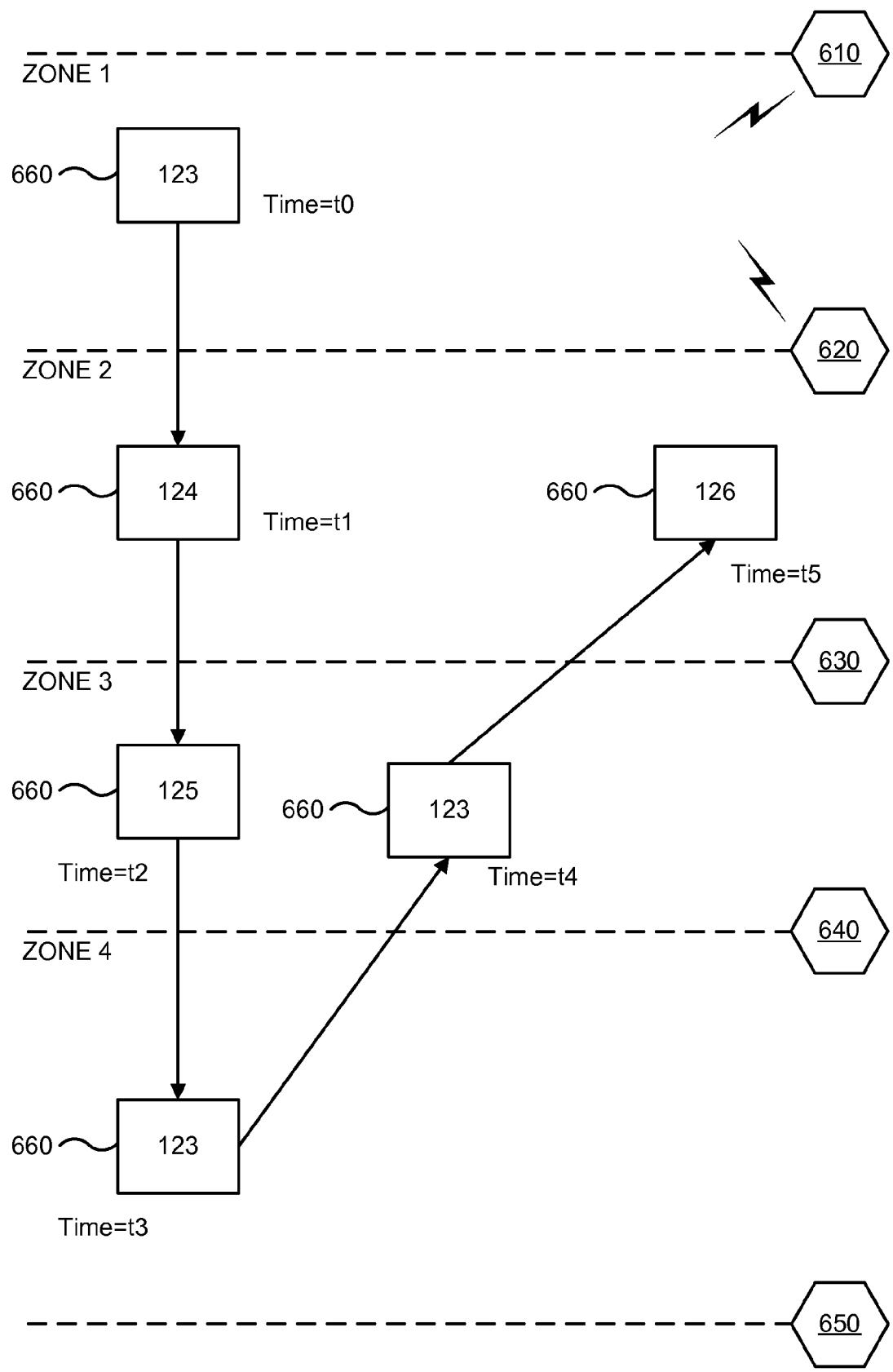
FIG. 6A is a block diagram illustrating movement and tracking of an object through various zones in one embodiment according to the present invention.

FIG. 6A is a block diagram illustrating movement and tracking of an object through various zones in one embodiment according to the present invention. As shown in FIG. 6A, several zones are formed between readers 610, 620, 630, 640, and 650. For example, Zone 1 is formed between readers 610 and 620. Zone 2 is formed between readers 620 and 630. Zone 3 is formed between readers 630 and 640. Zone 4 is formed between readers 640 and 650. Readers 610, 620, 630, 640, and 650 may be part of sensor devices 110 of FIG. 1.

At time t0, an object 660 is located within Zone 1. Readers 610 and 620 may read the value of an identifier for an RFID tag placed on object 660. In this example, the value of the identifier for the RFID tag is "123."

Before time t1, object 660 moves from Zone 1 to Zone 2. Readers 620 and 630 then may read the value of the identifier for the RFID tag placed on object 660. In this example, upon reading the identifier before time t1, sensor devices interface 140 determines a new external identifier for the RFID tag associated with object 660. For example, the value "124" may be assigned as the new identifier for the RFID tag. Sensor devices interface 140 then instructs readers 620 and/or 630 to store the new external identifier "124" in the RFID tag. Therefore at time t1, readers 620 and 630 may read the value of the identifier for the RFID tag placed on object 660 as "124."

Sensor devices interface 140 maintains a mapping between the external identifiers associated with the RFID tag, and an internal identifier associated with object 660. Accordingly, object 660 may be tracked by applications interfacing with sensor devices interface 140. However, external application will have "lost" object 660 when object 660 moves from Zone 1 to Zone 2.

Before time t2, object 660 moves from Zone 2 to Zone 3. Readers 630 and 640 then may read the value of the identifier for the RFID tag placed on object 660. In this example, upon reading the identifier before time t2, sensor devices interface 140 determines a new external identifier for the RFID tag associated with object 660. For example, the value "125" may be assigned as the new identifier for the RFID tag. Sensor devices interface 140 then instructs readers 630 and/or 640 to store the new external identifier "125" in the RFID tag. Therefore at time t2, readers 630 and 640 may read the value of the identifier for the RFID tag placed on object 660 as "125."

Sensor devices interface 140 updates the mapping between the external identifiers associated with the RFID tag, and the internal identifier associated with object 660. Accordingly, object 660 may again be tracked by applications interfacing with sensor devices interface 140. However, external application will again "lose" object 660 when object 660 moves from Zone 2 to Zone 3.

Before time t3, object 660 moves from Zone 3 to Zone 4. Readers 640 and 650 then may read the value of the identifier for the RFID tag placed on object 660. In this example, upon reading the identifier before time t3, sensor devices interface 140 determines to again rotate the external identifier for the RFID tag associated with object 660. Sensor devices interface 140 determines to re-use or reassign the value "123" the external identifier for the RFID tag.

Sensor devices interface 140 then instructs readers 640 and/or 650 to store the new external identifier "123" in the RFID tag. Sensor devices interface 140 updates the mapping between the external identifiers associated with the RFID tag, and the internal identifier associated with object 660. Therefore at time t3, readers 630 and 640 may read the value of the identifier for the RFID tag placed on object 660 as "123."

Before time t4, object 660 moves from Zone 4 to Zone 3. Readers 630 and 640 then may read the value of the identifier for the RFID tag placed on object 660. In this example, upon reading the identifier before time t4, sensor devices interface 140 determines to keep the existing external identifier for the RFID tag associated with object 660. Therefore at time t4, readers 630 and 640 may read the value of the identifier for the RFID tag placed on object 660 as "123."

Before time t5, object 660 moves from Zone 3 to Zone 2. Readers 620 and 630 then may read the value of the identifier for the RFID tag placed on object 660. In this example, upon reading the identifier before time t5, sensor devices interface 140 determines a new external identifier for the RFID tag associated with object 660. For example, the value "126" may be assigned as the new identifier for the RFID tag. Sensor devices interface 140 then instructs readers 620 and/or 630 to store the new external identifier "126" in the RFID tag. Therefore at time t5, readers 620 and 630 may read the value of the identifier for the RFID tag placed on object 660 as "126."

Sensor devices interface 140 updates the mapping between the external identifiers associated with the RFID tag, and the internal identifier associated with object 660. Accordingly, object 660 may again be tracked by applications interfacing with sensor devices interface 140. However, external application will again "lose" object 660 when object 660 moves from Zone 3 to Zone 2.

Accordingly, at each of a plurality of times, a different external identifier may be associated with object 660. In various embodiments, external identifiers are reissued to provide randomization and possibly to employ windowing to reduce size requirements of external identifiers.

Figure 6B:
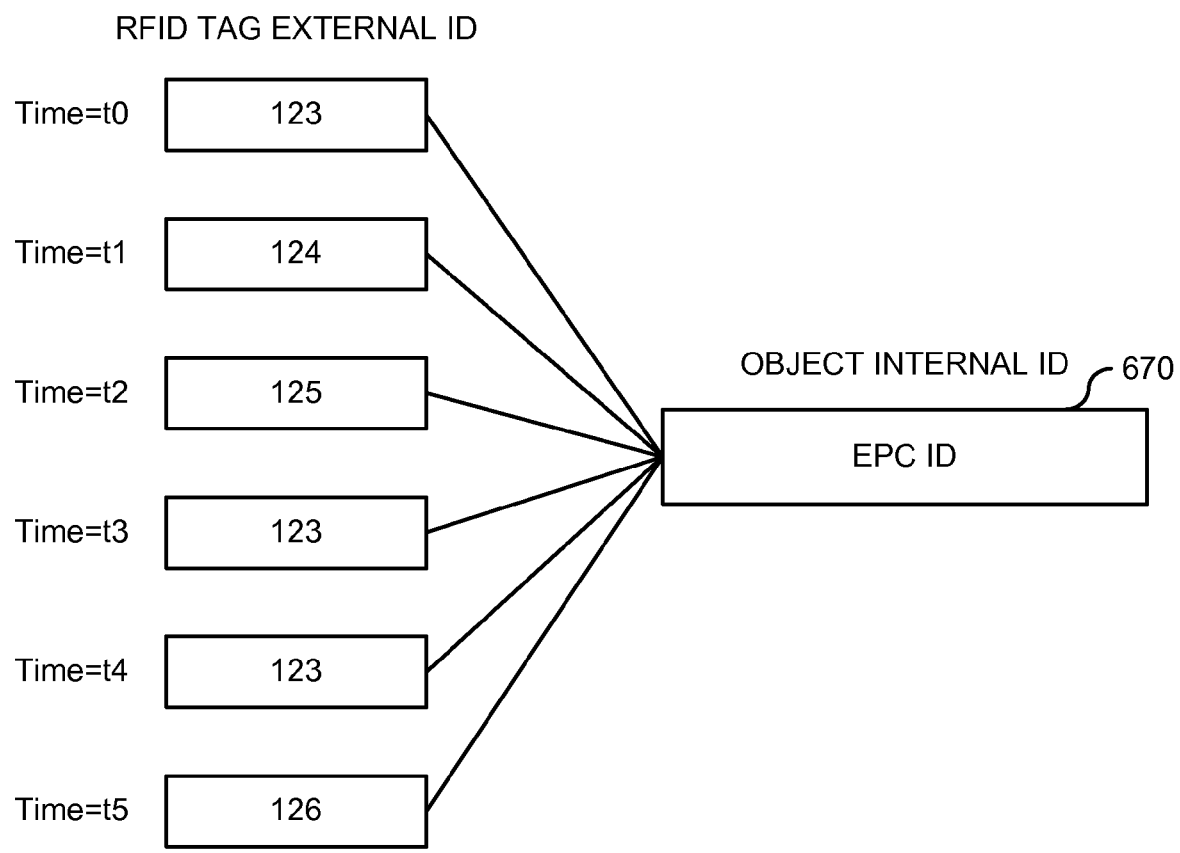
FIG. 6B is a block diagram illustrating associations in FIG. 6A between RFID tag identifiers and object identifiers in one embodiment according to the present invention.

FIG. 6B is a block diagram illustrating associations in FIG. 6A between RFID tag identifiers and object identifiers in one embodiment according to the present invention. In this example, external identifiers for the RFID tag placed on object 660 at the various times t0, t1, t2, t3, t4, and t5, are mapped by sensor devices interface 140 to an internal identifier 670 associated with object 660. Some examples of internal identifier 670 are an EPC identifier, a UPC code, and the like. Applicants interfacing with sensor devices interface 140 may received the internal identifier 670 and "track" object 660. However, sensor devices interface 140 provides security and privacy for the external identifiers associated with object 660 through the mapping shown in FIG. 6B.

Figure 7A:
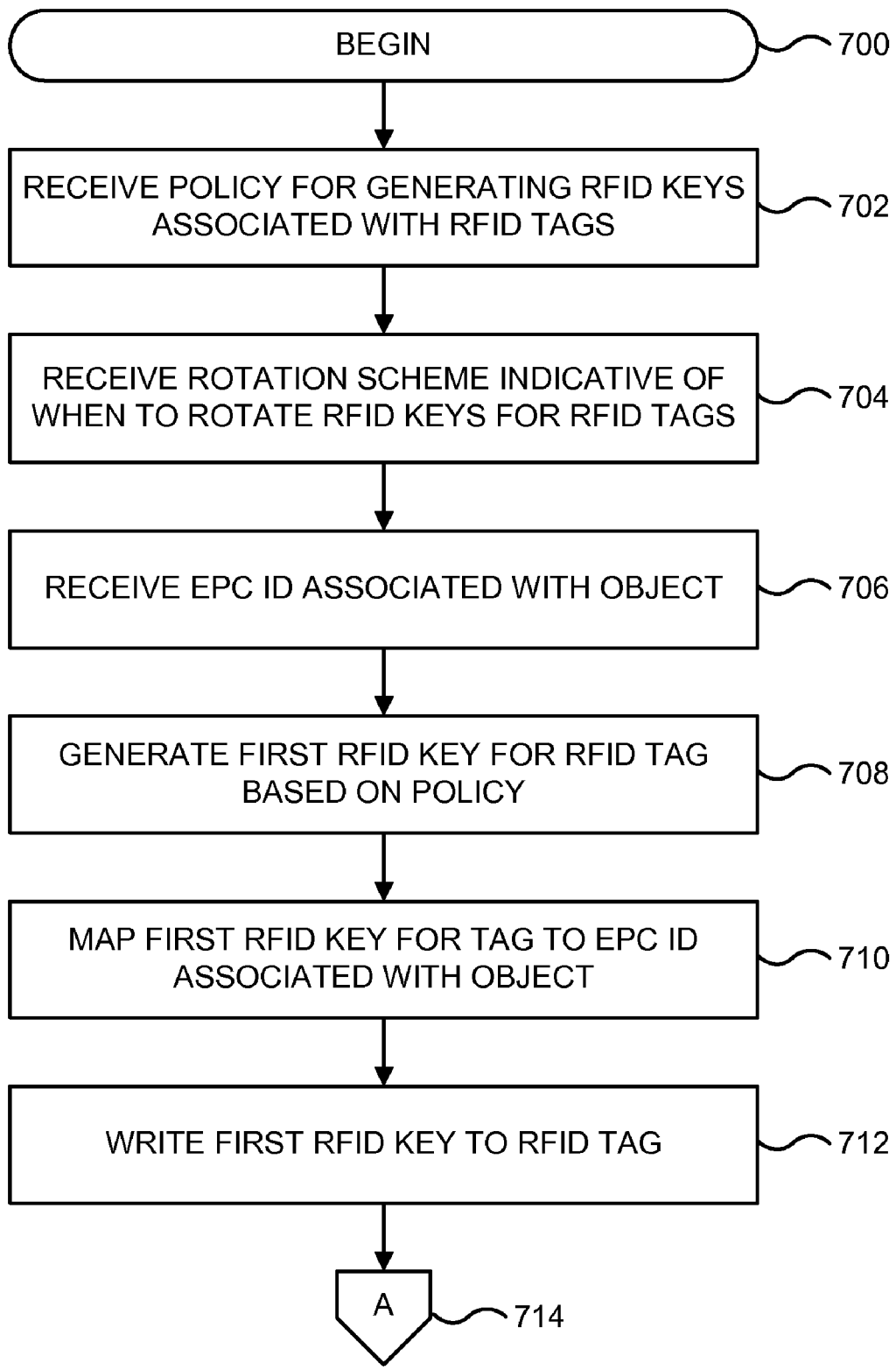
FIGS. 7A, 7B, and 7C are a flowchart for key rotation in one embodiment according to the present invention.
Figure 7B:
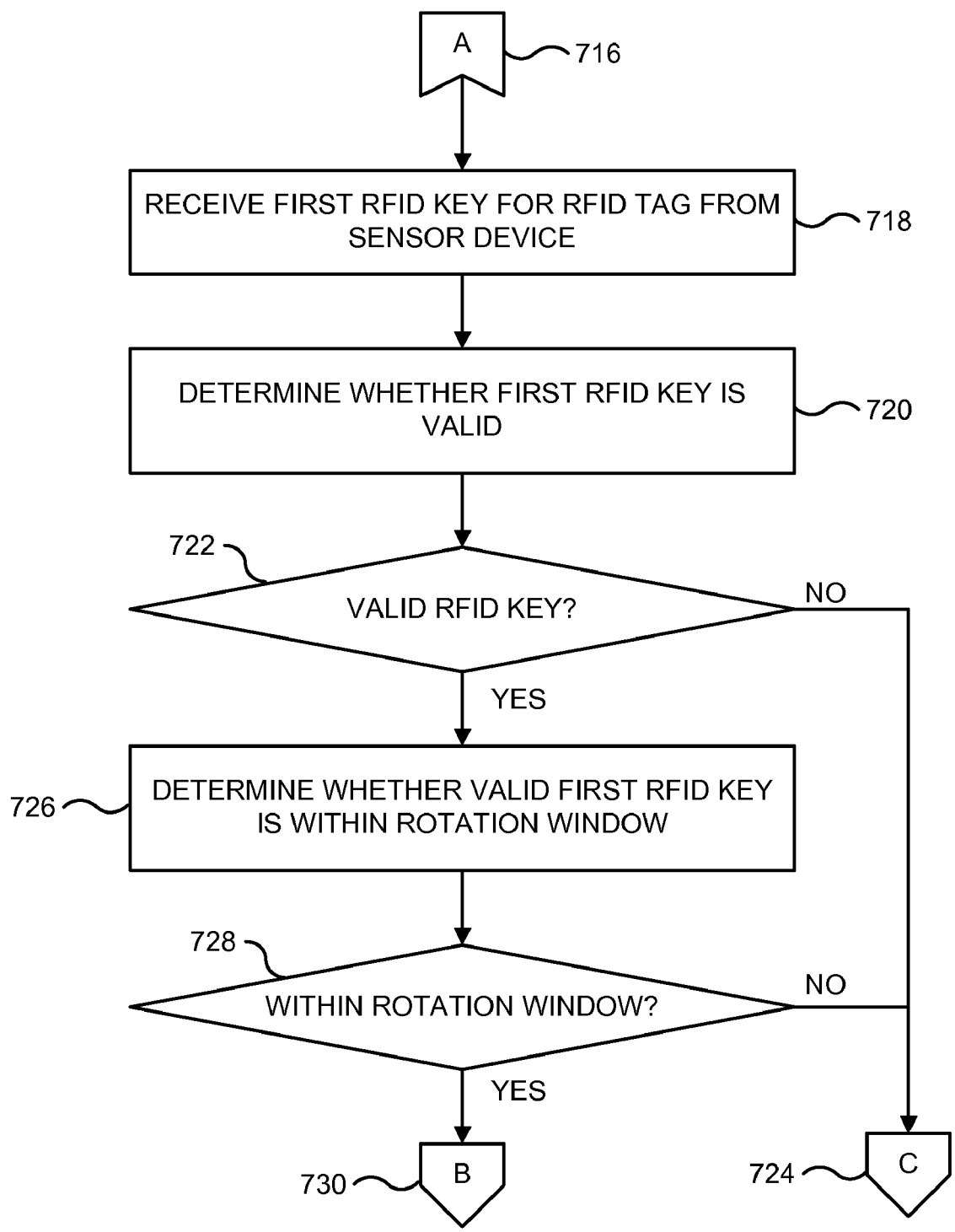
Figure 7C:
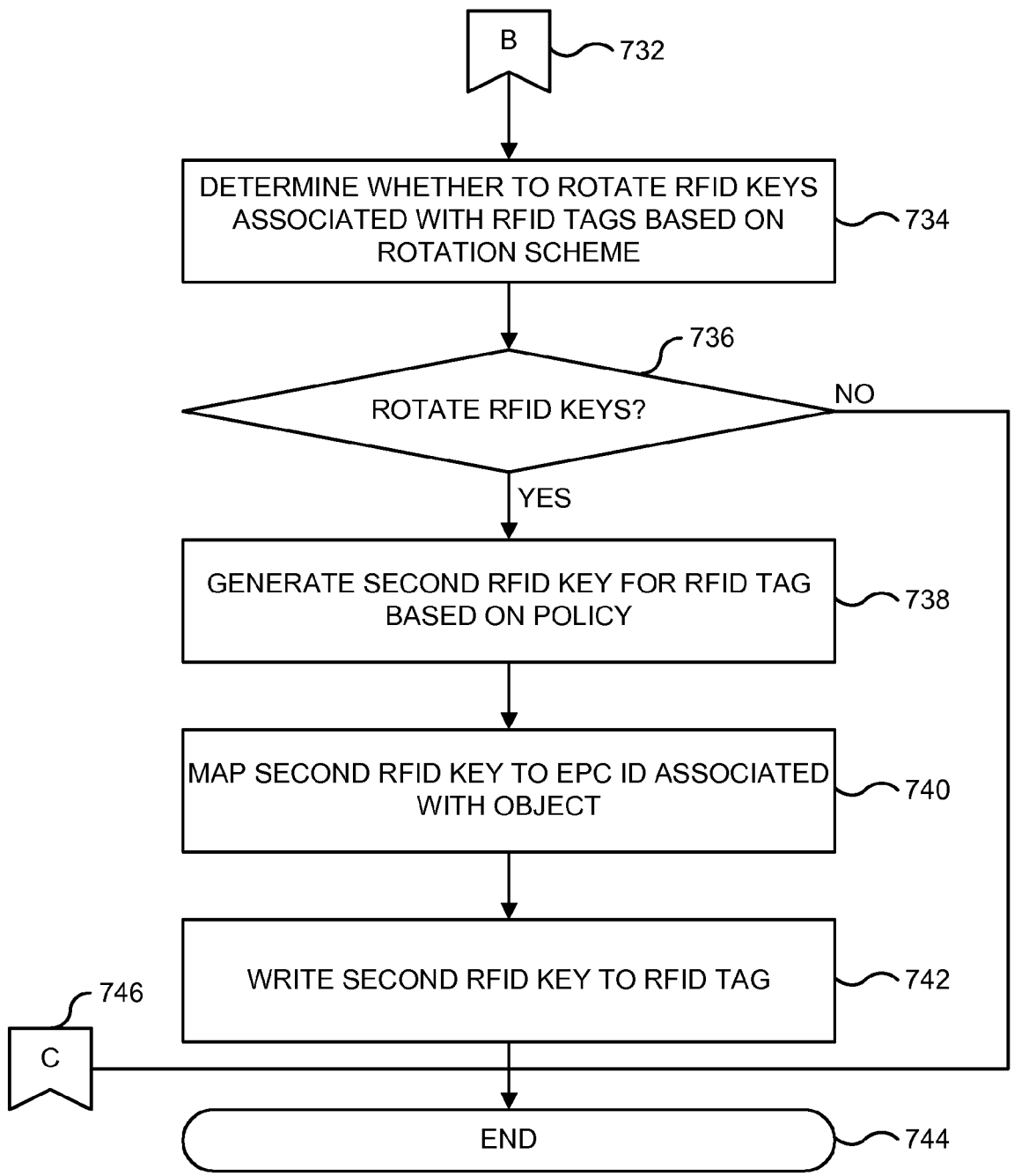

FIGS. 7A, 7B, and 7C are a flowchart for key rotation in one embodiment according to the present invention. FIG. 7A begins in step 700.

In step 702, sensor devices interface 140 receives a policy for generating RFID keys (or identifiers) associated with RFID tags. A policy is any set of statements, rules, or criteria. A policy generally defines how to generate external RFID keys are generated. For example, a policy may include one or more rules indicating size, length, characters, format, language, and the like, for generating an RFID key or identifier. A policy may include criteria associated with different types of objects, such as electronics, house wares, and hazardous materials, for generating RFID identifiers associated with a particular type of object. A policy may also define a window used for mapping internal identifiers to external identifiers.

In step 704, sensor devices interface 140 receives a rotation scheme indicative of when to rotate RFID keys associated with RFID tags. A rotation scheme is any set of statements, rules, or criteria. A rotation scheme generally defines a decision step to rotate an RFID key or identifier. In one example, a rotation scheme defines at which of the times t0, t1, t2, t3, t4, and t5 of FIG. 6A to rotate. In another example, a rotation scheme defines one or more locations, such as Zone 2 or Zone 3 of FIG. 6A, at which an RFID tag may receive a new key or identifier.

In step 706, sensor devices interface 140 receives an EPC ID associated with an object. In this example, the EPC ID represents the internal identifier associated with an object (e.g., object 660 of FIG. 6A). In step 708, sensor devices interface 140 generates a first RFID key for an RFID tag (e.g., placed on object 660) based on the policy. In one example, sensor devices interface 140 generates a 128-bit RFID key. The 128-bit RFID key includes a 32-bit identifier that is unique to sensor devices interface 140 and 96-bit signature or checksum. The 32-bit identifier may be generated based on a window.

In step 710, sensor devices interface 140 maps the first RFID key for the RFID tag to the EPC ID associated with the object. In step 712, sensor devices interface 140 stores or writes the first RFID key to the RFID tag. FIG. 7A ends in step 714.

FIG. 7B begins in step 716. In step 718, sensor devices interface 140 receives the first RFID key for the RFID tag from a sensor device, such as reader 300. In step 720, sensor devices interface 140 determines whether the first RFID key is valid. For example, sensor devices interface 140 may determine whether the first RFID key has been validly formed, includes a valid signature, has been validly issued, and the like.

If the RFID key is not valid, sensor devices interface 140 continues processing in step 724. If the RFID key is valid, in step 726, sensor devices interface 140 determines whether the valid first RFID key is within a rotation window. In this example, sensor devices interface 140 generates reduced bit keys for RFID tags within the given rotation window.

If the RFID key is within the rotation window, sensor devices interface 140 continues processing in step 730, else sensor devices interface 140 continues processing in step 724. FIG. 7B ends in step 730 and step 724.

FIG. 7C begins in step 732. In step 734, sensor devices interface 140 determines whether to rotate the RFID key associated with RFID tag based on the rotation scheme. If sensor devices interface 140 determines to rotate the RFID key in step 736, sensor devices interface 140 generates a second RFID key for the RFID tag based on the policy in step 738.

In step 740, sensor devices interface 140 maps the second RFID key to the EPC ID associated with the object. In step 742, sensor devices interface 140 writes or stores the second RFID key to the RFID tag.

If sensor devices interface 140 determines not to rotate the RFID key in step 736, or if the key is not valid in step 746, sensor devices interface 140 ends processing in step 744.

As described above, system 100 provides for mapping of external identifiers associated with RFID keys to internal identifiers associated with objects. This allows the tracking of objects, while reducing some of the privacy concerns associated with RFID tags. Using system 100, Windows associated with RFID tags may be used to reduce the number of bits required to track object associated with RFID tags. Furthermore, different types of schemes and policies may be used to rotate the external RFID identifiers to prevent security breaches such as spoofing or denial of service attacks.

Figure 8:
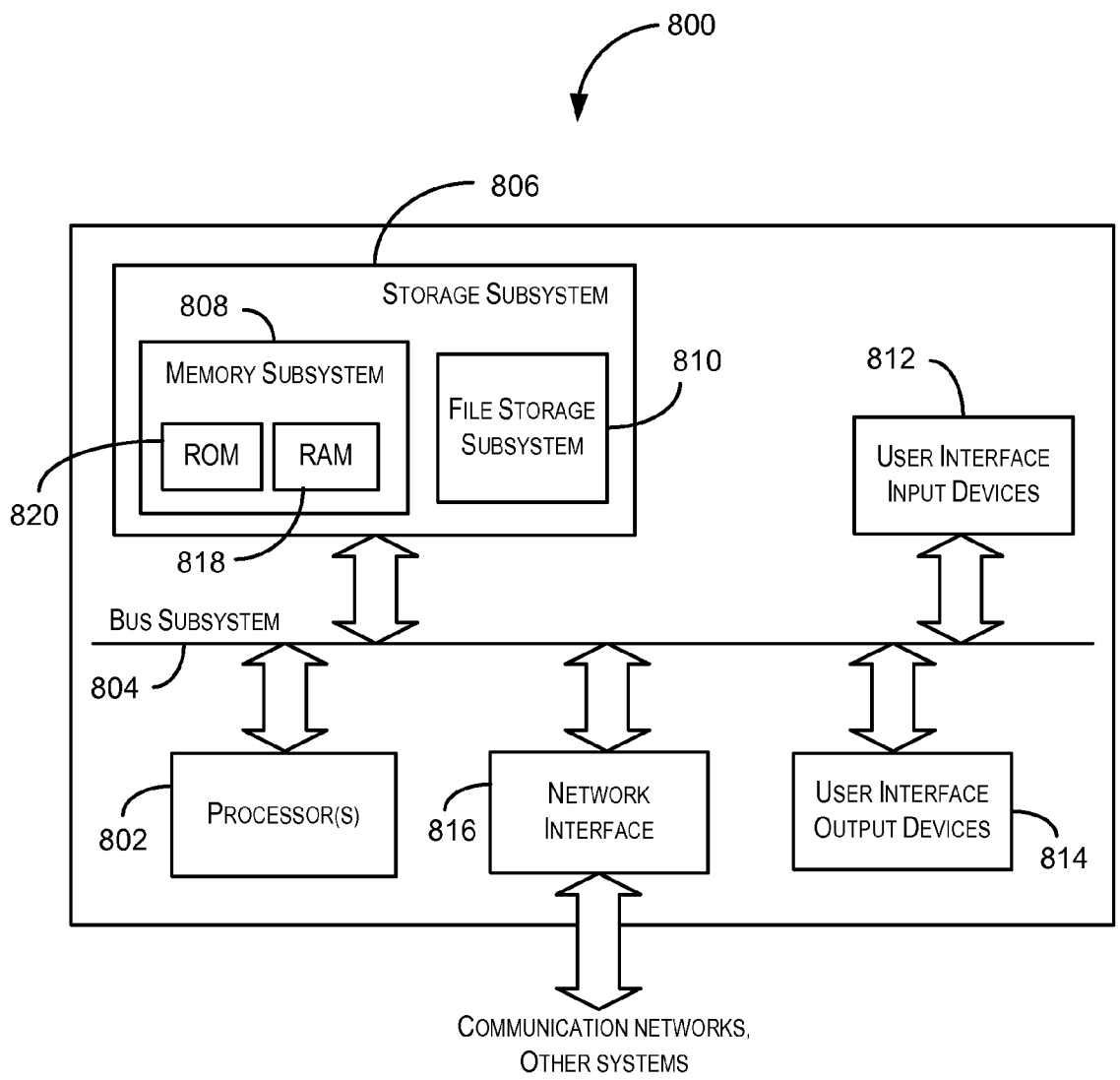
FIG. 8 is a simplified block diagram of a computer system that may be used to practice embodiments of the present invention.

FIG. 8 is a simplified block diagram of a computer system 800 that may be used to practice embodiments of the present invention. As shown in FIG. 8, computer system 800 includes a processor 802 that communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems, and networks, and devices. Network interface subsystem 816 serves as an interface for receiving data from and transmitting data to other systems from computer system 800.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 800.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 may be configured to store the basic programming and data constructs that provide the functionality of the present invention. Software (code modules or instructions) that provides the functionality of the present invention may be stored in storage subsystem 806. These software modules or instructions may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 800 can be of various types including a personal computer, a portable computer, a workstation, a network computer, a mainframe, a kiosk, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method for tracking objects, the method comprising:
    receiving, at one or more computer systems that provide one or more applications with tracking information associated with objects, information that associates a first identifier with an object, the first identifier configured to be used by the one or more applications to obtain tracking information associated with the object;
    determining, with one or more processors associated with the one or more computer systems, a bit-reducing scheme associated with an organization for generating identifiers to be stored in tags associated with the organization;
    generating, with the one or more processors associated with the one or more computer systems, a second identifier based on the bit-reducing scheme, the second identifier having a predetermined portion corresponding to the organization set according to the bit-reducing scheme, the second identifier further being different than the first identifier;
    generating, with the one or more processors associated with the one or more computer systems, information that associates the first identifier with the second identifier such that the one or more applications obtain first tracking information for the object based on the first identifier associated with the object, the first tracking information derived in part from at least one of one or more tag reading devices reading a subset of bits associated with the second identifier from at least one of one or more tags associated with the object;
    generating, with the one or more processors associated with the one or more computer systems, a third identifier based on the bit-reducing scheme, the third identifier missing the predetermined portion corresponding to the organization and configured to be stored in a first tag associated with the object and readable from the first tag by one or more tag reading devices to recognize the first tag when the first tag is in the presence of the one or more tag reading devices, the third identifier further being different than the first identifier and the second identifier;

determining, with the one or more processors associated with the one or more computer systems, whether to rotate an identifier currently stored in the first tag with another identifier for the first tag;

based on a positive determination to rotate an identifier currently stored in the first tag with another identifier for the first tag, generating, with the one or more processors associated with the one or more computer systems, a fourth identifier based on the bit-reducing scheme, the fourth identifier having the predetermined portion corresponding to the organization set according to the bit-reducing scheme, the fourth identifier further being different than the first identifier, the second identifier, and the third identifier;

generating, with the one or more processors associated with the one or more computer systems, information that associates the first identifier with the fourth identifier such that the one or more applications obtain second tracking information for the object based on the first identifier associated with the object, the second tracking information derived in part from at least one of one or more tag reading devices reading a subset of bits associated with the fourth identifier from at least one of one or more tags associated with the object;

generating, with the one or more processors associated with the one or more computer systems, a fifth identifier based on the bit-reducing scheme, the fifth identifier missing the predetermined portion corresponding to the organization and configured to be stored in the first tag and readable from the first tag by one or more tag reading devices to recognize the first tag when the first tag is in the presence of the one or more tag reading devices, the fifth identifier further being different than the first identifier, the second identifier, the third identifier, and the fourth identifier; and generating, with the processor associated with the computer system, one or more instructions for writing the fifth identifier to the first tag.

2. The method of claim 1 further comprising:
receiving, at the one or more computer systems, a policy specifying creation of identifiers for the tags associated with the organization, the policy defining the bit-reducing scheme.

3. The method of claim 1 further comprising:
receiving, at the one or more computer systems, a policy specifying creation of identifiers for the tags associated with the organization, the policy defining a rotation scheme indicating when to change identifiers for the tags associated with the organization.

4. The method of claim 1 wherein generating, with the one or more processors associated with the one or more computer systems, the second identifier based on the bit-reducing scheme comprises:
receiving, at the one or more computer systems, a window for the bit-reducing scheme indicative of validity of the second identifier, the window specifying a range mask as the predetermined portion corresponding to the organization set according to the bit-reducing scheme, the range mask indicative of a range of bits to be applied to the third identifier to generate the second identifier.

5. The method of claim 1 further comprising:
based on another positive determination to rotate an identifier currently stored in the first tag with another identifier for the first tag, generating, with the one or more computer systems, a sixth identifier based on the bit-reducing scheme, the sixth identifier having the predetermined portion set according to the bit-reducing scheme, the sixth identifier being different than the first identifier and each of one or more identifiers previously generated according to the bit-reducing scheme;

generating, with the one or more processors associated with the one or more computer systems, information that associates the first identifier with the sixth identifier such that the one or more applications obtain third tracking information for the object based on the first identifier associated with the object, the third tracking information derived in part from at least one of one or more tag reading devices reading a subset of bits associated with the sixth identifier from at least one of one or more tags associated with the object;

generating, with the one or more processors associated with the one or more computer systems, a seventh identifier based on the bit-reducing scheme, the seventh identifier missing the predetermined portion corresponding to the organization and configured to be stored in the first tag and readable from the first tag by one or more tag reading devices to recognize the first tag when the first tag is in the presence of the one or more tag reading devices, the seventh identifier further being different than the first identifier and each of one or more identifiers previously generated according to the bit-reducing scheme; and generating, with the processor associated with the computer system, one or more instructions for writing the seventh identifier to the first tag.

6. A method for tracking objects, the method comprising:
receiving, at one or more computer systems that provide one or more applications with tracking information associated with objects, an Electronic Product Code associated with an object, the Electronic Product Code used by the one or more applications to obtain tracking information associated with the object;

generating, with one or more processors associated with the one or more computer systems, a first identifier based on a policy associated with an organization, the first identifier having a first portion identifying the organization and a second portion randomized according to the policy, the first identifier further being different than the Electronic Product Code used by the one or more applications for tracking the object;

generating, with the one or more processors associated with the one or more computer systems, information associating the Electronic Product Code with the first identifier such that the one or more applications obtain first tracking information for the object based on the Electronic Product Code, the first tracking information derived in part from at least one of one or more tag reading devices reading all or part of the second portion of the first identifier from at least one of one or more tags associated with the object;

generating, with the one or more processors associated with the one or more computer systems, a second identifier based on the policy, the second identifier missing the first portion of the first identifier and configured with all or part of the second portion of the first identifier;

determining, with the one or more processors associated with the one or more computer systems, whether to rotate an identifier currently stored in a tag associated with the object with another identifier for the tag;

based on a positive determination to rotate an identifier currently stored in the tag associated with the object with another identifier for the tag, generating, with the one or more processors associated with the one or more computer systems, a third identifier based on the policy associated with the organization, the third identifier having a first portion identifying the organization and a second portion randomized according to the policy, the third identifier further being different than the first identifier, the second identifier, and the Electronic Product Code used by the one or more applications for tracking the object;

generating, with the one or more processors associated with the one or more computer systems, information associating the Electronic Product Code with the third identifier such that the one or more applications obtain second tracking information for the object based on the Electronic Product Code, the second tracking information derived in part from at least one of one or more tag reading devices reading all or part of the second portion of the third identifier from at least one of one or more tags associated with the object;

generating, with the one or more processors associated with the one or more computer systems, a fourth identifier based on the policy, the fourth identifier missing the first portion of the third identifier and configured with all or part of the second portion of the third identifier; and generating, with the processor associated with the computer system, one or more instructions for writing the fourth identifier to the tag associated with the object.

7. The method of claim 1 wherein the tag comprise an RFID tag.

8. A data processing system for tracking objects, the system comprising:

a processor; and a memory coupled to the processor, the memory configured to store a plurality of code modules which when executed by the processor configure the processor to:

receive information that associates a first identifier with an object, the first identifier configured to be used by one or more applications to obtain tracking information associated with the object;

determine a bit-reducing scheme associated with an organization for generating identifiers to be stored in tags associated with the organization;

generate a second identifier based on the bit-reducing scheme, the second identifier having a predetermined portion corresponding to the organization set according to the bit-reducing scheme, the second identifier further being different than the first identifier;

generate information that associates the first identifier with the second identifier such that the one or more applications obtain first tracking information for the object based on the first identifier associated with the object, the first tracking information derived in part from at least one of one or more tag reading devices reading a subset of bits associated with the second identifier from at least one of one or more tags associated with the object;

generate a third identifier based on the bit-reducing scheme, the third identifier missing the predetermined portion corresponding to the organization and configured to be stored in a first tag associated with the object and readable from the first tag by one or more tag reading devices to recognize the first tag when the first tag is in the presence of the one or more tag reading devices, the third identifier further being different than the first identifier and the second identifier;

determine whether to rotate an identifier currently stored in the first tag with another identifier for the first tag;

based on a positive determination to rotate an identifier currently stored in the first tag with another identifier for the first tag, generate a fourth identifier for the object based on the bit-reducing scheme, the fourth identifier having the predetermined portion corresponding to the organization set according to the bit-reducing scheme, the fourth identifier being different than the first identifier, the second identifier, and the third identifier;

generate information that associates the first identifier with the fourth identifier such that the one or more applications obtain second tracking information for the object based on the first identifier associated with the object, the second tracking information derived in part from at least one of one or more tag reading devices reading a subset of bits associated with the fourth identifier from at least one of one or more tags associated with the object;

generate a fifth identifier based on the bit-reducing scheme, the fifth identifier missing the predetermined portion corresponding to the organization and configured to be stored in the first tag and readable from the first tag by one or more tag reading devices to recognize the first tag when the first tag is in the presence of the one or more tag reading devices, the fifth identifier further being different than the first identifier, the second identifier, the third identifier, and the fourth identifier; and generate one or more instructions to write the fifth identifier to the first tag.

9. The system of claim 8 wherein the processor is further configured to:

receive a policy specifying creation of identifiers for the tags associated with the organization, the policy defining the bit-reducing scheme.

10. The system of claim 8 wherein the processor is further configured to:

receive a policy specifying creation of identifiers for the tags associated with the organization, the policy defining a rotation scheme indicating when to rotate identifiers for the tags associated with the organization.

11. The system of claim 8 wherein the processor is further configured to generate the second identifier based on the bit reducing scheme in response to:

receiving a window for the bit-reducing scheme indicative of validity of the second identifier, the window specifying a range mask as the predetermined portion associated with the organization to be applied to the third identifier to generate the second identifier.

12. The system of claim 8 wherein, based on another positive determination to rotate an identifier for the first tag with another identifier currently stored in the first tag, the processor is further configured to:

generate a sixth identifier based on the bit-reducing scheme, the sixth identifier having the predetermined portion set according to the bit-reducing scheme, the sixth identifier being different than the first identifier and each of one or more identifiers previously generated according to the bit-reducing scheme;

generate information that associates the first identifier with the sixth identifier such that the one or more applications obtain third tracking information for the object based on the first identifier associated with the object, the third tracking information derived in part from at least one of one or more tag reading devices reading a subset of bits associated with the sixth identifier from at least one of one or more tags associated with the object;

generate a seventh identifier based on the bit-reducing scheme, the seventh identifier missing the predetermined portion corresponding to the organization and configured to be stored in the first tag and readable from the first tag by one or more tag reading devices to recognize the first tag when the first tag is in the presence of the one or more tag reading devices, the seventh identifier further being different than the first identifier and each of one or more identifiers previously generated according to the bit-reducing scheme; and generate one or more instructions to write the seventh identifier to the first tag.

13. The system of claim 8 wherein the first identifier associated with the object comprises an Electronic Product Code identifier.

14. The system of claim 8 wherein the tag comprise an RFID tag.

15. A non-transitory computer readable medium storing computer-executable code for tracking objects, the non-transitory computer-readable medium comprising:

code for receiving information that associates a first identifier with an object, the first identifier configured to be used by one or more applications to obtain tracking information associated with the object;

code for receiving a bit-reducing scheme associated with an organization for generating identifiers to be stored in tags associated with an organization;

code for generating a second identifier based on the bit-reducing scheme, the second identifier having a predetermined portion corresponding to the organization set according to the bit-reducing scheme, the second identifier further being different than the first identifier;

code for generating information that associates the first identifier with the second identifier such that the one or more applications obtain first tracking information for the object based on the first identifier associated with the object, the first tracking information derived in part from at least one of one or more reading devices reading a subset of bits associated with the second identifier from at least one of one or more tags associated with the object;

code for generating a third identifier based on the bit-reducing scheme, the third identifier missing the predetermined portion corresponding to the organization and configured to be stored in a first tag associated with the object and readable from the first tag by one or more tag reading devices to recognize the first tag when the first tag is in the presence of the one or more tag reading devices, the third identifier further being different than the first identifier and the second identifier;

code for determining whether to rotate an identifier currently stored in the first tag with another identifier for the first tag;

code for, based on a positive determination to rotate an identifier currently stored in the first tag with another identifier for the first tag, generating a fourth identifier based on the bit-reducing scheme, the fourth identifier having the predetermined portion corresponding to the organization set according to the bit-reducing scheme, the fourth identifier being different than the first identifier, the second identifier, and the third identifier;

generating information that associates the first identifier with the fourth identifier such that the one or more applications obtain second tracking information for the object based on the first identifier associated with the object, the second tracking information derived in part from at least one of one or more tag reading devices reading a subset of bits associated with the fourth identifier from at least one of one or more tags associated with the object;

generating a fifth identifier based on the bit-reducing scheme, the fifth identifier missing the predetermined portion corresponding to the organization and configured to be stored in the first tag and readable from the first tag by one or more tag reading devices to recognize the first tag when the first tag is in the presence of the one or more tag reading devices, the fifth identifier further being different than the first identifier, the second identifier, the third identifier, and the fourth identifier; and generating one or more instructions for writing the fifth identifier to the first tag.

16. The non-transitory computer-readable medium of claim 15 further comprising:

code for receiving a policy specifying creation of identifiers for the tags associated with the organization, the policy defining the bit-reducing scheme.

17. The non-transitory computer-readable medium of claim 15 further comprising:

code for receiving a policy specifying creation of identifiers for the tags associated with the organization, the policy defining a rotation scheme indicating when to change identifiers for the tags associated with the organization.

18. The non-transitory computer-readable medium of claim 15 wherein the code for generating the second identifier based on the bit reducing scheme comprises:

code for receiving a window for the bit-reducing scheme indicative of validity of the second identifier, the window specifying a range mask as the predetermined portion corresponding to the organization set according to the bit-reducing scheme, the range mask indicative of a range of bits to be applied to the third identifier to generate the second identifier.

19. The non-transitory computer-readable medium of claim 15 further comprising code for, based on another positive determination to rotate an identifier currently stored in the first tag with another identifier for the first tag:

generating a sixth identifier according to the bit-reducing scheme, the sixth identifier having the predetermined portion corresponding to the organization set according to the bit-reducing scheme, the sixth identifier being different than the first identifier and each of one or more identifiers previously generated according to the bit-reducing scheme;

generating information that associates the first identifier with the sixth identifier such that the one or more applications obtain third tracking information for the object based on the first identifier associated with the object, the third tracking information derived in part from at least one of one or more tag reading devices reading a subset of bits associated with the sixth identifier from at least one of one or more tags associated with the object;

generating a seventh identifier based on the bit-reducing scheme, the seventh identifier missing the predetermined portion corresponding to the organization and configured to be stored in the first tag and readable from the first tag by one or more tag reading devices to recognize the first tag when the first tag is in the presence of the one or more tag reading devices, the seventh identifier further being different than the first identifier and each of one or more identifiers previously generated according to the bit-reducing scheme; and generating one or more instructions for writing the seventh identifier to the first tag.

20. The non-transitory computer-readable medium of claim 15 wherein the first identifier associated with the object comprises an Electronic Product Code identifier.

* * * * *